(12) United States Patent
Mignano (10) Patent No.: US 12,074,493 B2
(45) Date of Patent: Aug. 27, 2024

(54) CONVEYOR SYSTEM

(71) Applicant: OCM S.P.A., Sorbolo Mezzani (IT)

(72) Inventor: Paolo Mignano, Novara (IT)

(73) Assignee: Material Handling Systems, Inc., Mt. Washington, KY (US)

(*) Notice: Subject to any disclaimer, the term of this patent is extended or adjusted under 35 U.S.C. 154(b) by 111 days.

(21) Appl. No.: 17/760,942

(22) PCT Filed: Sep. 25, 2020

(86) PCT No.: PCT/EP2020/077003
§ 371 (c)(1),
(2) Date: Mar. 16, 2022

(87) PCT Pub. No.: WO2021/058800
PCT Pub. Date: Apr. 1, 2021

(65) Prior Publication Data
US 2022/0302814 A1    Sep. 22, 2022

(30) Foreign Application Priority Data

Sep. 27, 2019    (IT) .................. 102019000017441

(51) Int. Cl.
*H02K 41/025* (2006.01)
*B65G 23/23* (2006.01)
(Continued)

(52) U.S. Cl.
CPC .......... *H02K 41/025* (2013.01); *B65G 23/23* (2013.01); *B65G 54/02* (2013.01); *H02K 16/04* (2013.01)

(58) Field of Classification Search
CPC ...... H02K 41/025; H02K 16/04; B65G 23/23; B65G 47/96; B65G 54/02; B65G 47/52; B65G 17/345
(Continued)

(56) References Cited

U.S. PATENT DOCUMENTS 3,788,447 A * 1/1974 Stephanoff ............. B65G 23/23
                                                         198/852
4,463,290 A    7/1984 Asakawa et al.
(Continued)

FOREIGN PATENT DOCUMENTS

GB    2157636 A    10/1985
WO    96/14685 A1    5/1996

OTHER PUBLICATIONS

Canadian Intellectual Property Office, Examiner's Report issued in corresponding Application No. 3,155,152, dated Sep. 14, 2023.
(Continued)

*Primary Examiner* — Mark A Deuble
(74) *Attorney, Agent, or Firm* — Stites & Harbison, PLLC; David W. Nagle, Jr.; James R. Hayne (57) ABSTRACT

A conveyor system includes multiple carts that move along a track, along with a plurality of induction motors located along the track to propel the cart. Each cart includes a flipper, and each linear induction motor includes a first linear stator extending along a longitudinal axis of the motor and a second linear stator extending parallel to the first linear stator and positioned a distance away from the first linear stator. As the flipper of the cart passes between the first linear stator and the second linear stator, the cart is propelled along the track.

19 Claims, 7 Drawing Sheets

(51) Int. Cl.
*B65G 54/02* (2006.01)
*H02K 16/04* (2006.01)

(58) Field of Classification Search
USPC .............................. 198/619, 370.01–37.013
See application file for complete search history.

(56) References Cited

U.S. PATENT DOCUMENTS

| | | | | |
|---|---|---|---|---|
| 4,716,346 | A | | 12/1987 | Matsuo |
| 5,277,125 | A | * | 1/1994 | DiFonso ............... B60L 13/006 |
| | | | | 104/294 |
| 5,309,049 | A | * | 5/1994 | Kawada ................. B65G 54/02 |
| | | | | 198/619 |
| 5,552,649 | A | | 9/1996 | Cowan, Jr. |
| 6,009,992 | A | * | 1/2000 | Erceg ................... B65G 47/962 |
| | | | | 198/370.04 |
| 7,218,019 | B2 | * | 5/2007 | Potter ...................... H02K 5/04 |
| | | | | 310/156.01 |
| 7,808,133 | B1 | * | 10/2010 | Widdowson ........... H02K 41/03 |
| | | | | 310/12.05 |
| 8,232,689 | B2 | * | 7/2012 | Denne .................... H02K 21/24 |
| | | | | 310/179 |

OTHER PUBLICATIONS

Chinese National Intellectual Property Administration, Office Action issued in corresponding Application No. 202080067515.7, issued on Aug. 26, 2023.

* cited by examiner

CONVEYOR SYSTEM

TECHNICAL FIELD

The present invention relates to a conveyor system that includes multiple carts that move along a track to deliver parcels to designated areas along the track.

BACKGROUND OF THE INVENTION

Linear induction motors are often used in conveyor systems to propel carts along a track, but there has always been issues in the efficiency of using these motors. One known design utilizes a small gap between permanent magnets attached to the carts and stator windings attached to the track. When the size of the gap increases, the efficiency decreases. However, when the gap is too small, there can be other issues, such as mechanical contact between the moving parts. Furthermore, with the use of permanent magnets, there is an unwanted attraction force perpendicular to the intended thrust force in these motors which must be overcome. Control of these motors is complicated when successive carts pass by the motor, and issues can arise if there is a power loss to the motor during operation.

SUMMARY OF THE INVENTION

The present invention is a conveyor system that includes multiple carts, with each cart moving along a track, for example, a cross-belt conveyor system. A plurality of linear induction motors is positioned along the track to propel each of the carts.

One exemplary conveyor system made in accordance with the present invention comprises a track and multiple carts that move along the track. An exemplary cart includes a base and wheels which engage the track. The cart further includes a flipper that extends downward from the base and which interacts with a plurality of linear induction motors (LIM) located along the track.

One exemplary LIM includes eighteen coils contained within a housing, with spacers extending around and through the coils. The eighteen coils are positioned in two separate lines of nine coils, which collectively operate as a linear stator. In other words, the LIM includes a first linear stator of nine coils extending along a longitudinal axis of the LIM, along with a second linear stator of nine coils extending parallel to the first linear stator along the longitudinal axis of the LIM and positioned a distance away from the first linear stator, as discussed further below.

Each of the linear stators is a three-phase laminated stator. More specifically, the linear stators are arranged in a 9-6 slot-pole combination, which has a low harmonic content. In one exemplary embodiment, each of the phases of the two linear stators is electrically connected in parallel. That is to say, the U phase of the first linear stator is connected in parallel with the U phase of the second linear stator, the V phase of the first linear stator is connected in parallel with the V phase of the second linear stator, and the W phase of the first linear stator is connected in parallel with the W phase of the second linear stator. The operation of the first linear stator and the second linear stator is thereby synchronized.

The exemplary flipper is formed from a single aluminum plate. The flipper defines a plurality of slots which extend through the entire thickness of the flipper. In one exemplary embodiment, there are twenty-four (24) slots. The slots advantageously allow for easy detection of the position of the flipper as the flipper moves along the track and through the LIM by means of a linear encoder.

The housing also defines a channel along the length of the LIM, and the flipper of the cart is configured to move through the channel and between the two linear stators of the LIM. More specifically, the LIM and the flipper are designed such that, as the flipper passes through the LIM, there is no physical contact between the LIM and the flipper. This limits not only wear on the devices but also friction losses.

Furthermore, with such a double stator configuration, in which the flipper passes between the two linear stators, there is no resulting lateral attraction force on the flipper towards either of the linear stators. Instead, the flipper is propelled only along the longitudinal axis of the LIM, i.e., in the direction of travel of the cart along the track. Without a lateral attraction force acting on the flipper, the spacing between the flipper and the two linear stators can also be significantly reduced.

The design of the LIM of the present invention advantageously does not require any permanent magnets on the flipper of the cart. Therefore, there is no need for sensors to detect the position of the magnetic field of a permanent magnet. Likewise, the current applied to the LIM does not need to be adjusted when such a permanent magnet approaches or leaves the LIM. Furthermore, without permanent magnets, the thrust force on the aluminum flipper is a smooth waveform with very low oscillation. Further still, if the LIM unexpectedly loses power, the LIM remains inert without any effect on the rest of the conveyor system.

DESCRIPTION OF THE INVENTION

The present invention is a conveyor system that includes multiple carts, with each cart moving along a track. A plurality of linear induction motors is positioned along the track to propel each of the carts.

Figure 1:
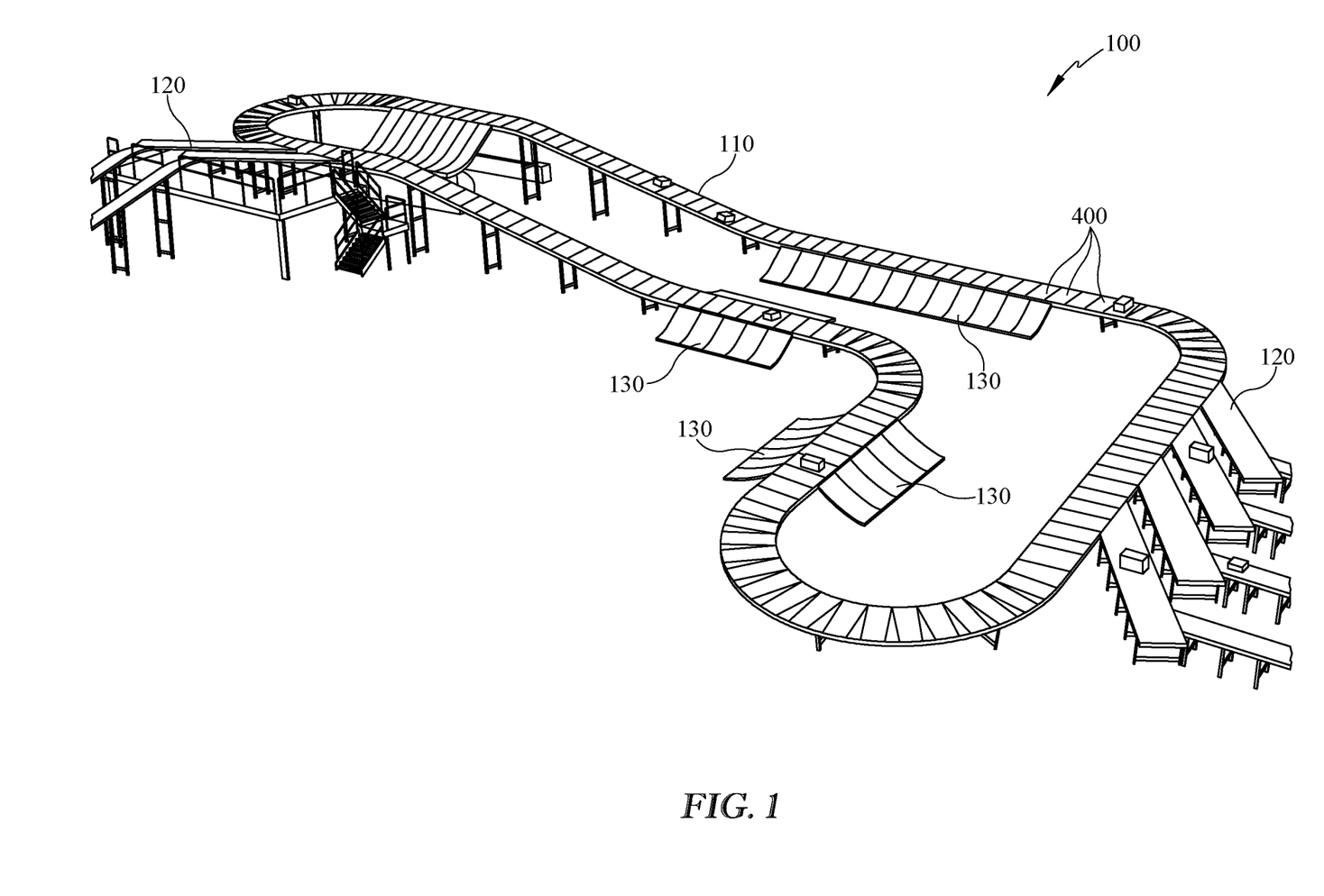
FIG. 1 is a perspective view of an exemplary conveyor system made in accordance with the present invention.

Referring first to FIG. 1, an exemplary conveyor system 100 made in accordance with the present invention comprises a track 110, which includes a variety of turns and changes in elevation. The conveyor system 100 further includes multiple carts 400 that move along the track 110, along with one or more feeder belts 120 that provide parcels onto the carts 400. The carts 400 then deposit these parcels into one or more sorter bins 130.

Figure 2:
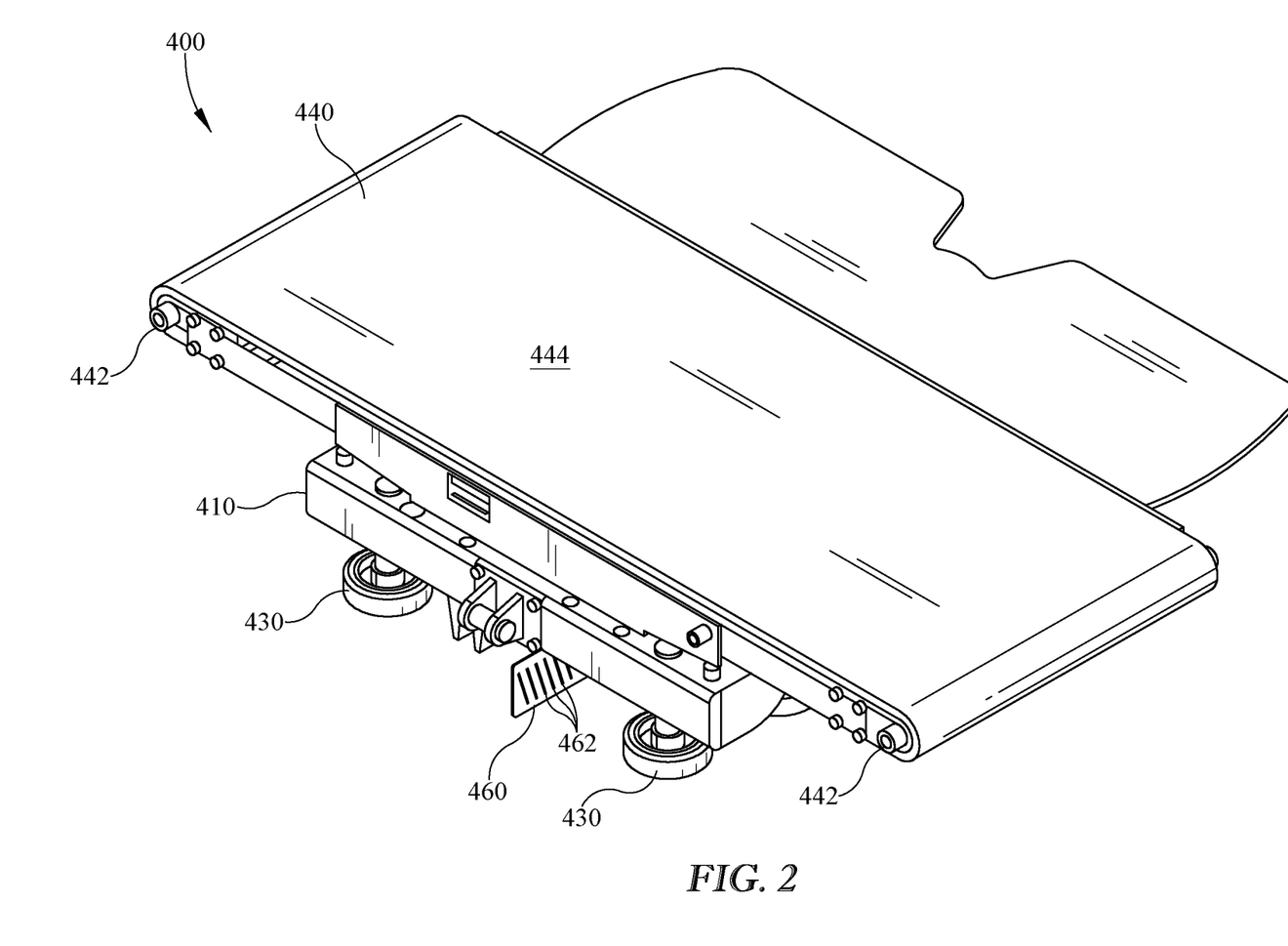
FIG. 2 is a perspective view of a cart of the conveyor system of FIG. 1 shown in isolation.
Figure 3:
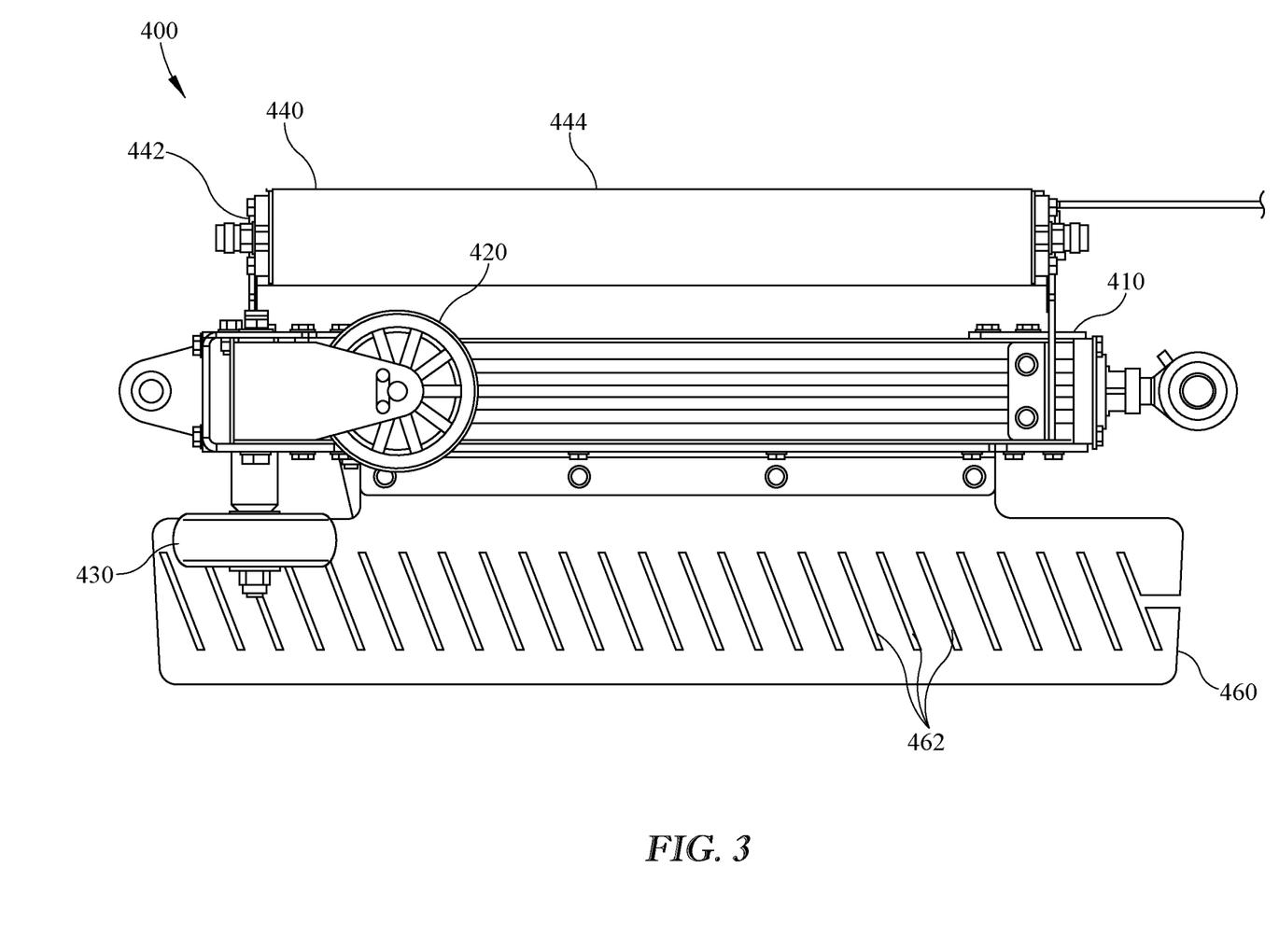
FIG. 3 is a side view of the cart of FIG. 2.
Figure 4:
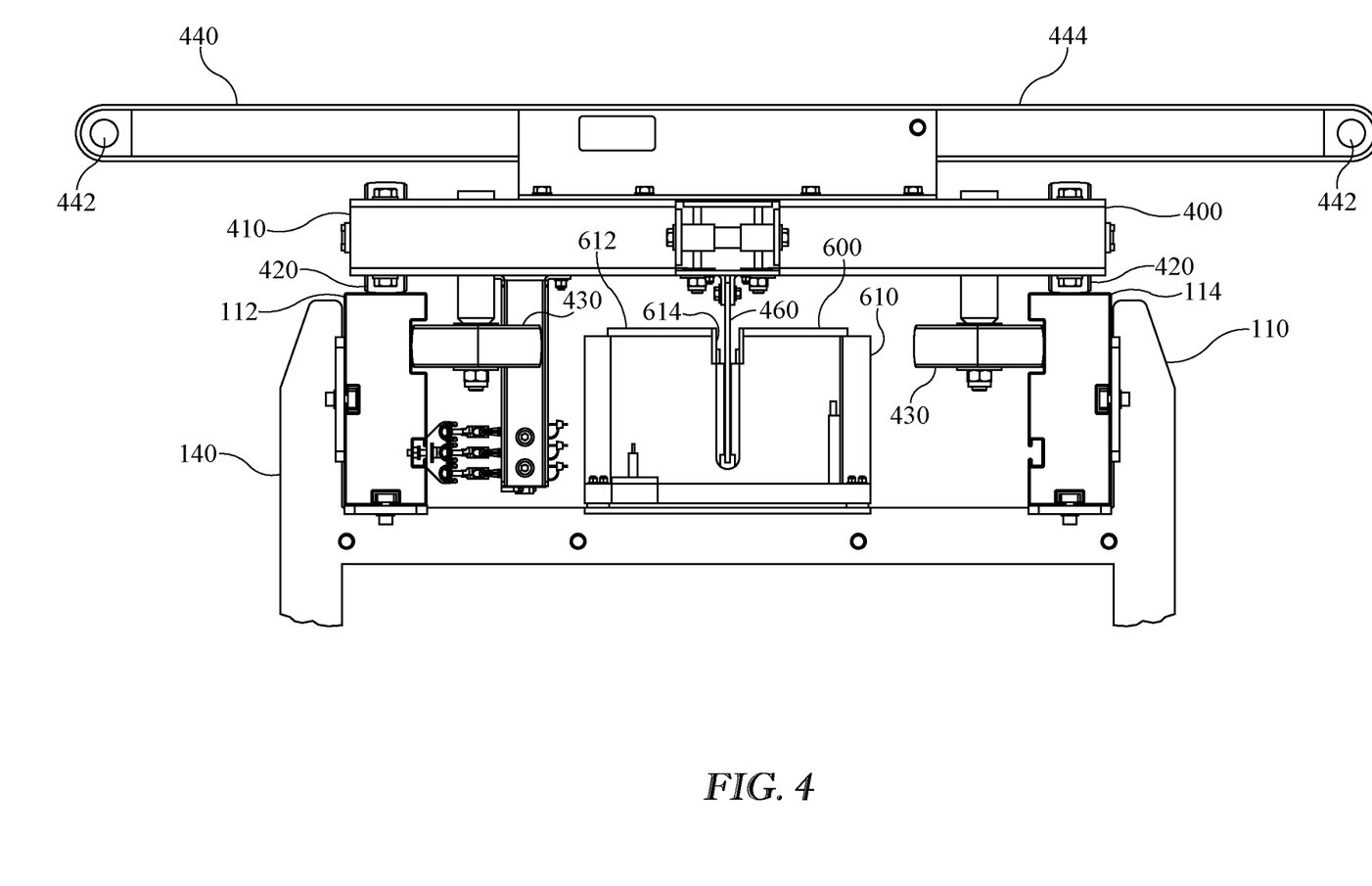
FIG. 4 is cross-sectional view of a cart on the track of the conveyor system of FIG. 1.

Referring now to FIGS. 2-4, and with respect to the carts 400 of the present invention, an exemplary cart 400 includes a base 410 with a belt conveyor 440 connected to the top of the base 410. The belt conveyor includes rollers 442 and a belt 444 which operate in a direction perpendicular to the direction of travel of the base 410 along the track 110. As such, while the cart 400 moves along the track 110, the conveyor 440 can readily accept parcels from the feeder belts 120 on either side of the cart 400 and deposit the parcels into the sorter bins 130 on either side of the cart 400.

The cart 400 further includes vertical wheels 420 and horizontal wheels 430 which engage the track 110. In particular, as shown in FIG. 4, the track 110 includes a first (or inner) rail 112 and a second (or outer) rail 114 which run parallel to one another and which are connected to a support frame 140. A first set of wheels 420, 430 engages the first rail 112 and a second set of wheels 420, 430 similarly engages the second rail 114. The cart 400 further includes a flipper 460 that extends downward from the base 410 and interacts with the linear induction motors (LIM) 600 located along the track 110 and connected to the support frame 140 between the two rails 112, 114.

Figure 5:
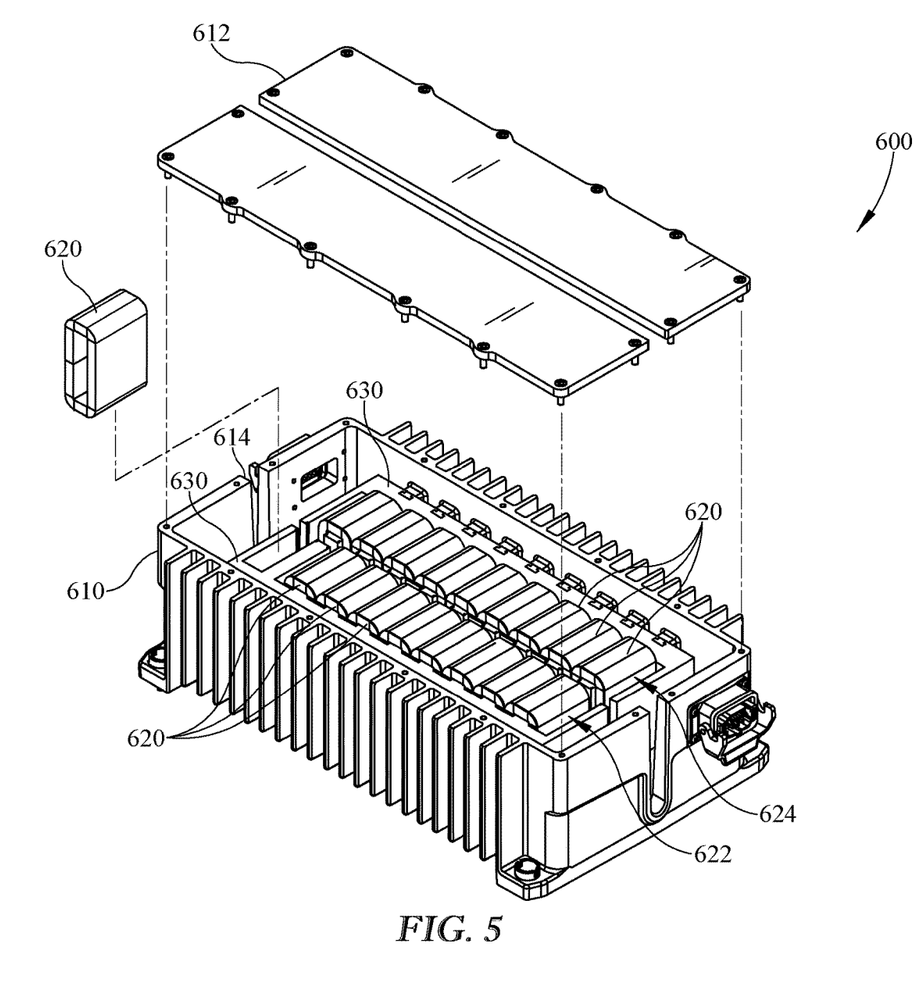
FIG. 5 is a partially exploded perspective view of a linear induction motor with a top of the housing raised and one of the coils removed.
Figure 6:
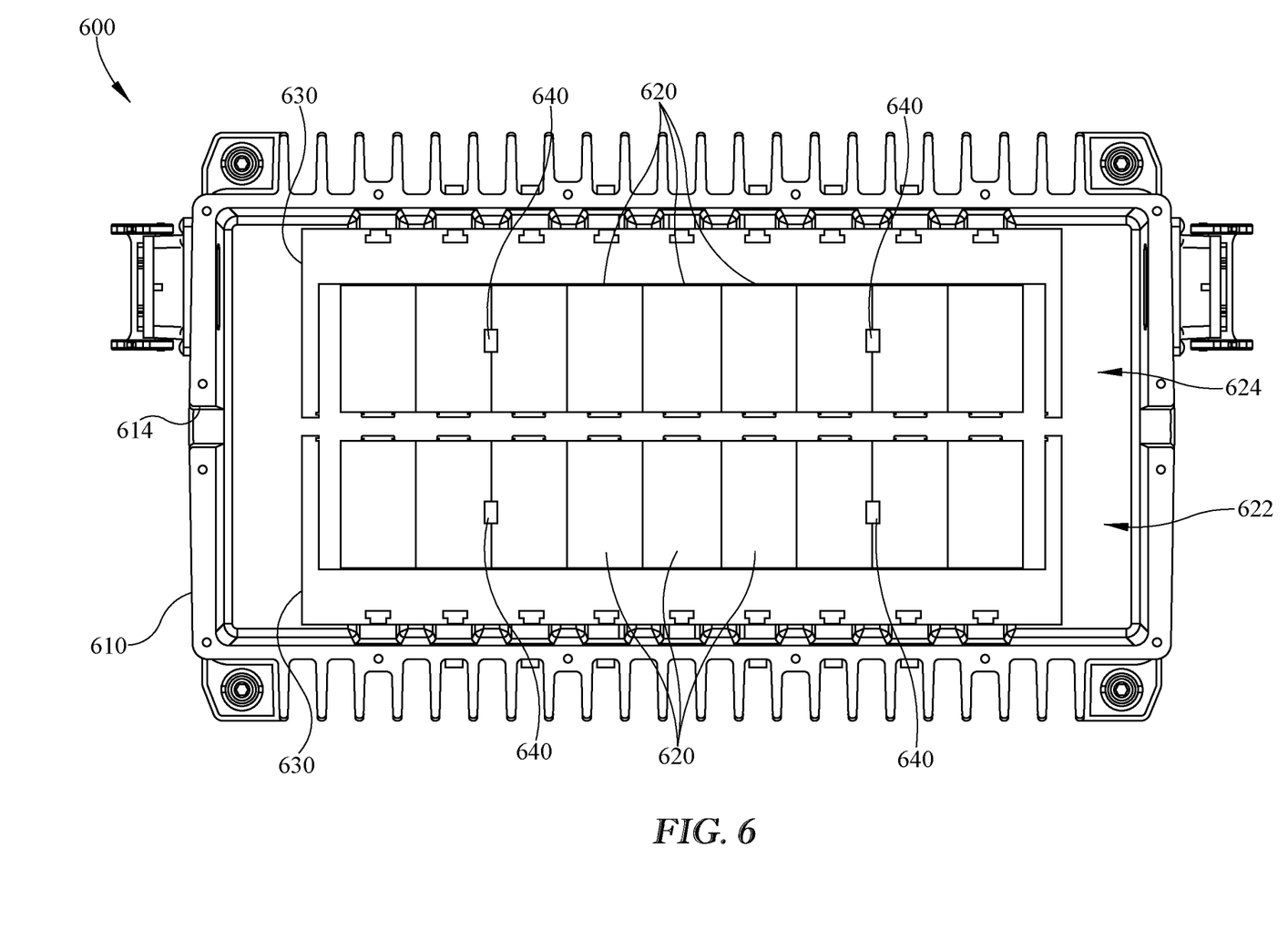
FIG. 6 is a top view of the linear induction motor of FIG. 5 with a top of the housing removed and schematically illustrating the position of thermal sensors.

Referring now to FIGS. 4-6, an exemplary LIM 600 includes eighteen coils 620 contained within a housing 610, with spacers 630 extending around and through the coils 620. In some exemplary embodiments, the housing 610 of the LIM 600 is comprised of aluminum and has a height of about 170 mm and a width of about 350 mm. As shown in FIG. 5, the housing 610 of the exemplary LIM 600 includes a removable top 612 which provides access to the coils 620 and other related electronics and wirings.

The eighteen coils 620 are positioned in two separate lines of nine coils, which collectively operate as a linear stator. In other words, the LIM 600 includes a first linear stator 622 of nine coils 620 extending along a longitudinal axis of the LIM 600 (i.e., a longitudinal axis of the track), along with a second linear stator 624 of nine coils 620 extending parallel to the first linear stator 622 along the longitudinal axis of the LIM 600 and positioned a distance away from the first linear stator 622, as discussed further below.

Figure 7:
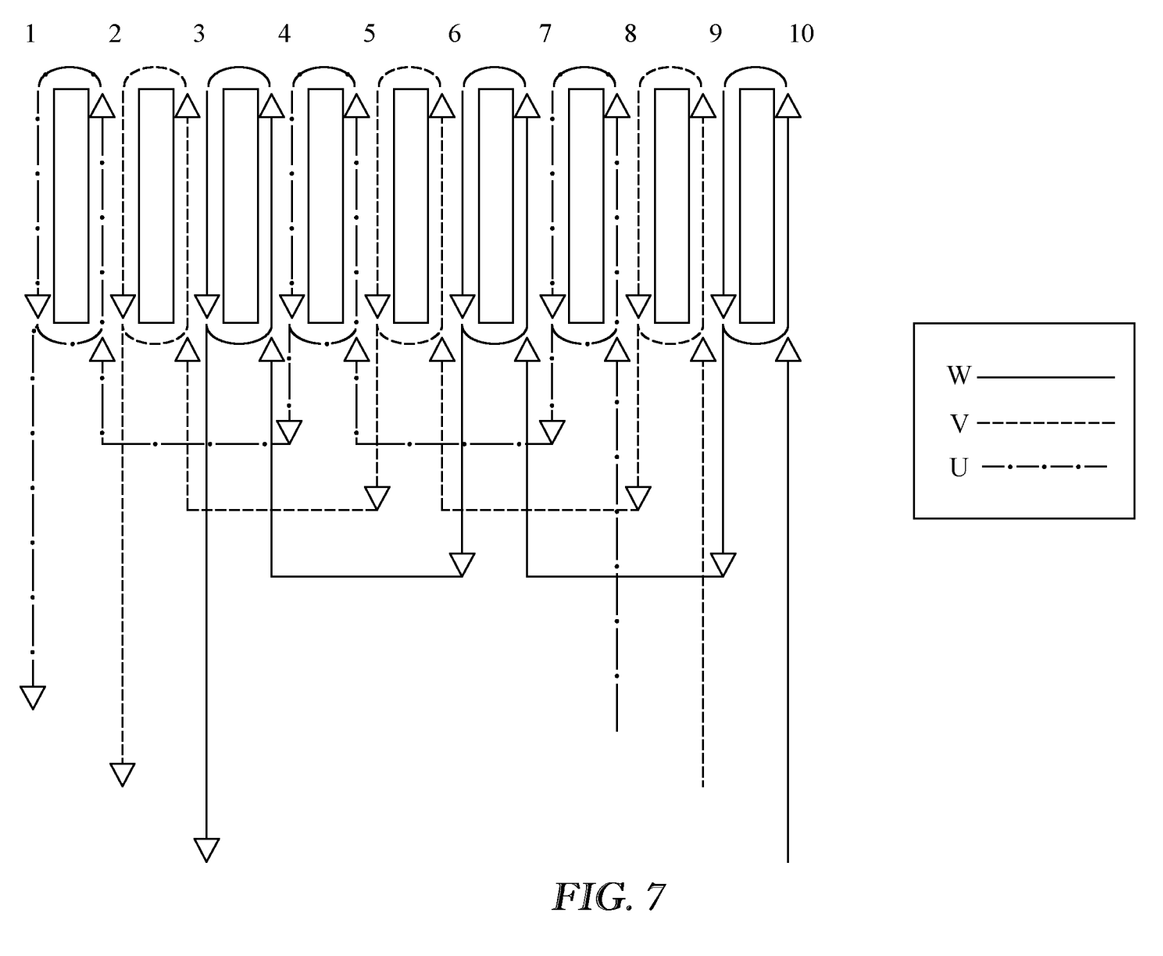
FIG. 7 is a schematic view illustrating the wiring of the linear stators in the linear induction motor.

Each of the linear stators 622, 624 is a three-phase laminated stator. More specifically, and referring now to FIG. 7, the linear stators 622, 624 are arranged in a 9-6 slot-pole combination, which has a low harmonic content. In one exemplary embodiment, each of the phases of the two linear stators 622, 624 is electrically connected in parallel. That is to say, the U phase of the first linear stator 622 is connected in parallel with the U phase of the second linear stator 624, the V phase of the first linear stator 622 is connected in parallel with the V phase of the second linear stator 624, and the W phase of the first linear stator 622 is connected in parallel with the W phase of the second linear stator 624. The operation of the first linear stator 622 and the second linear stator 624 is thereby synchronized.

Referring once again to FIGS. 2-4, the exemplary flipper 460 is formed from a single aluminum plate that is about 800 mm long and about 5 mm thick. The flipper 460 defines a plurality of slots 462 which extend through the entire thickness of the flipper 460. In one exemplary embodiment, there are twenty-four (24) slots 462, each of which is about 4 mm wide. The slots 462 advantageously allow for easy detection of the position of the flipper 460 as the flipper 460 moves along the track 110 by means of a linear encoder.

In particular, in some embodiments of the present invention, one or more linear encoders are positioned along the track which includes a plurality of optical sensors capable of detected when the slots 462 of the flipper 460 pass in front of the optical sensor. In one particular embodiment, a linear encoder includes seven optical sensors that are positioned in line and spaced apart the same distance as the slots 462 of the flipper 460. These seven optical sensors thereby provide information about the position of the flipper 460, and thus the cart 400, as the slots 462 pass across the optical sensors in order to assist in forming loading, center, and unloading operations. The exemplary linear encoder further includes an eighth optical sensor that is not in line with the other optical sensors. This additional sensor is used to identify the presence of the cart 400.

As previously mentioned, the first linear stator 622 is positioned a distance away from the second linear stator 624. In some embodiments, the first linear stator 622 is positioned less than or equal to about 20 mm away from the second linear stator 624. In one exemplary embodiment, there is a distance of about 17 mm between the coils 620 of the first linear stator 622 and the coils 620 of the second linear stator 624 and a distance of about 11 mm between the spacers 630 of the first linear stator 622 and the spacers 630 of the second linear stator 624.

The housing 610 also defines a channel 614 along the length of the LIM 600, and, as shown in FIG. 4, the flipper 460 of the cart 400 is configured to move through the channel 614 and between the two linear stators 622, 624 of the LIM 600. More specifically, the LIM 600 and the flipper 460 are designed such that, as the flipper 460 passes through the LIM 600, there is no physical contact between the LIM 600 and the flipper 460. This limits not only wear on the devices but also friction losses.

Furthermore, with such a double stator configuration in which the flipper 460 passes between the two linear stators 622, 624, there is no resulting lateral attraction force on the flipper 460 towards either of the linear stators 622, 624. Instead, the flipper 460 is propelled only along the longitudinal axis of the LIM 600, i.e., in the direction of travel of the cart 400 along the track 110. By comparison, a typical linear synchronous motor creates an attraction force in the vertical direction between the stator and the moving permanent magnet which creates increased drag on the cart that must be overcome with additional power supplied to the stator. The present invention therefore improves efficiency over a typical linear synchronous motor.

Without a lateral attraction force acting on the flipper 460, the spacing between the flipper 460 and the two linear stators 622, 624 can also be significantly reduced as compared to a typical linear synchronous motor. In a typical linear synchronous motor, the spacing must be increased in order to avoid physical contact between the moving element and the stators, which then requires increased power supplied to the stators to maintain sufficient thrust. The LIM 600 of the present invention therefore exhibits higher efficiency as compared to a typical linear synchronous motor.

Table A provides the technical requirements for one exemplary linear induction motor of the present invention.

TABLE A

| Parameter | Symbol | Value | Measure of Unit |
|---|---|---|---|
| Thrust Force | Fn | 160 | N |
| Rated Voltage | Un | 400 | Vrms |
| Rated Current | In | 10 | Arms |
| IP Degree | IP | 54 | — |
| Rated Frequency | fn | 50 | Hz |
| Pole Pairs | Pp | 3 | — |
| Insulation Class | | F | — |
| Maximum Overcurrent | Ipk | 1, 7*In | Arms |
| Duty Cycle | Sc | S1 | — |
| Rated Power | Pn | 384 | W |
| Rated Mechanical Speed | vn | 2.4 | m/s |

Table B provides the winding characteristic for one exemplary linear induction motor of the present invention.

TABLE B

| Parameter | Symbol | Measure Unit | Value |
|---|---|---|---|
| Pole Pairs | p | — | 3 |
| Voltage Supply | $V_{IN}$ | [$V_{Bus}$ DC] | $400*\sqrt{2}$ |
| Insulation Class | | — | F |
| Maximum Current Density | $j_{rms}$ | $\left[\dfrac{A}{mm^2}\right]$ | 10 |
| Slot Filling Factor | $k_{fill}$ | [p.u.] | 0.43 |
| Lamination Stack Length | $L_{stk}$ | [mm] | 80 |
| Phase-to-Phase Resistance | $R_{ph-ph}$ | [Ω] | 3.8 |
| Phase-to-Phase Inductance | $L_{ph-ph}$ | [H] | 0.295 |
| Slot Conductors | $n_c$ | — | 520 |
| Winding Arrangement Type | | | Concentrated winding Double Layer |
| Magnetic Wire Diameter | $D_{Cu}$ | [mm] | 1.4 |
| Magnetic Wire Area | $S_{Cu}$ | [mm$^2$] | 1.54 |
| Theoretical Magnetic Wire Length (per one phase) | $L_{Cu}$ | [m] | — |

The design of the LIM 600 of the present invention advantageously does not require any permanent magnets on the flipper 460 of the cart 400. Therefore, there is no need for sensors to detect the position of the magnetic field of a permanent magnet. Likewise, the current applied to the LIM 600 does not need to be adjusted when such a permanent magnet approaches or leaves the LIM 600. Furthermore, without permanent magnets, the thrust force on the aluminum flipper 460 is a smooth waveform with very low oscillation. Further still, if the LIM 600 unexpectedly loses power, the LIM 600 remains inert without any effect on the rest of the conveyor system 100.

Additionally, the overall size and weight of the LIM 600 is reduced as there is no need for additional slots to close the windings of the linear stators 622, 624.

Overall, the LIM 600 of the present invention provides a significant reduction in the total resistance of the linear stators 622, 624 which reduces the power loss of the LIM 600.

Referring now to FIG. 6 in particular, the exemplary LIM 600 further includes thermal sensors 640 placed within the housing 610 and adjacent to the coils 620. The thermal sensors 640 are used to ensure that the LIM 600 does not overheat during operation. One exemplary thermal sensor contemplated for use in the LIM 600 of the present invention is the KTY84/130 silicon temperature sensor available from NXP® Semiconductors N.V. (Eindhoven, Netherlands). Multiple (two) thermal sensors 640 are positioned adjacent to the first linear stator 622 and connected in parallel. Likewise, multiple (two) thermal sensors 640 are positioned adjacent to the second linear stator 624 and connected in parallel. These two sets of sensors 640 are then connected in series. Preferably, the resulting equivalent resistance of the sensors is 300Ω.

One of ordinary skill in the art will also recognize that additional embodiments are also possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the present invention.

What is claimed is:

1. A linear induction motor, comprising:
   a first linear stator extending along a longitudinal axis of the motor; and
   a second linear stator extending parallel to the first linear stator and positioned a distance away from the first linear stator;
   wherein the first linear stator and the second linear stator propel a flipper positioned between the first linear stator and the second linear stator along the longitudinal axis of the motor; and
   wherein the first linear stator and the second linear stator each have a slot-pole configuration in which coils do not overlap in a direction perpendicular to the longitudinal axis of the motor.

2. The linear induction motor of claim 1, wherein the first linear stator, the second linear stator, or both the first linear stator and the second linear stator are three-phase laminated stators.

3. The linear induction motor of claim 1, wherein the first linear stator and the second linear stator each have a 9-6 slot-pole configuration.

4. The linear induction motor of claim 1, wherein the first linear stator is connected in parallel with the second linear stator.

5. The linear induction motor of claim 1, wherein the first linear stator and the second linear stator are three-phase laminated stators;
   wherein a U phase of the first linear stator is connected in parallel with a U phase of the second linear stator;
   wherein a V phase of the first linear stator is connected in parallel with a V phase of the second linear stator; and
   wherein a W phase of the first linear stator is connected in parallel with a W phase of the second linear stator.

6. The linear induction motor of claim 1, wherein the linear induction motor further includes one or more thermal sensors positioned adjacent to the first linear stator and the second linear stator.

7. A linear induction motor, comprising:
   a first linear stator extending along a longitudinal axis of the motor; and
   a second linear stator extending parallel to the first linear stator and positioned a distance away from the first linear stator;
   wherein the first linear stator and the second linear stator propel a flipper positioned between the first linear stator and the second linear stator along the longitudinal axis of the motor; and
   wherein the first linear stator includes multiple thermal sensors connected in parallel, the second linear stator includes multiple thermal sensors connected in parallel, and the thermal sensors of the first linear stator are connected in series with the thermal sensors of the second linear stator.

8. A conveyor system including a cart that moves along a track and a plurality of linear induction motors located along the track to propel the cart, each of the plurality of linear induction motors comprising:
   a first linear stator extending along a longitudinal axis of the track;
   a second linear stator extending parallel to the first linear stator and positioned a distance away from the first linear stator;
   wherein as a flipper of the cart passes between the first linear stator and the second linear stator, the cart is propelled along the track; and
   wherein the flipper defines a plurality of slots that extend through the entire thickness of the flipper.

9. The conveyor system of claim 8, wherein the flipper is comprised of aluminum.

10. The conveyor system of claim 8, wherein the flipper is about 800 mm long.

11. The conveyor system of claim 8, wherein the flipper is about 5 mm thick.

12. The conveyor system of claim 8, wherein the flipper is formed from a single plate.

13. The conveyor system of claim 8, wherein each slot of the plurality of slots is about 4 mm wide.

14. The conveyor system of claim 8, wherein the first linear stator, the second linear stator, or both the first linear stator and the second linear stator are three-phase laminated stators.

15. The conveyor system of claim 8, wherein the first linear stator and the second linear stator each have a slot-pole configuration.

16. The conveyor system of claim 8, wherein the first linear stator and the second linear stator each have a 9-6 slot-pole configuration.

17. The conveyor system of claim 8, wherein the first linear stator is connected in parallel with the second linear stator.

18. The conveyor system of claim 8, wherein the first linear stator and the second linear stator are three-phase laminated stators;
   wherein a U phase of the first linear stator is connected in parallel with a U phase of the second linear stator;
   wherein a V phase of the first linear stator is connected in parallel with a V phase of the second linear stator; and
   wherein a W phase of the first linear stator is connected in parallel with a W phase of the second linear stator.

19. The conveyor system of claim 8, wherein the first linear stator includes multiple thermal sensors connected in parallel, the second linear stator includes multiple thermal sensors connected in parallel, and the thermal sensors of the first linear stator are connected in series with the thermal sensors of the second linear stator.

* * * * *